United States Patent [19]

Gelbein et al.

[11] 3,929,811

[45] Dec. 30, 1975

[54] PRODUCTION OF PYRIDINE NITRILES AND CARBOXYLIC ACIDS

[75] Inventors: Abraham P. Gelbein, Plainfield; Morgan C. Sze, Upper Montclair; John E. Paustian, Whippany, all of N.J.

[73] Assignee: The Lummus Company, Bloomfield, N.J.

[22] Filed: Apr. 25, 1974

[21] Appl. No.: 463,882

Related U.S. Application Data

[63] Continuation-in-part of Ser. No. 415,991, Nov. 15, 1973, abandoned.

[52] U.S. Cl..... 260/295.5 R; 260/294.9; 260/295 R
[51] Int. Cl.² ........................................ C07D 213/79
[58] Field of Search ................... 260/294.9, 295.5 R

[56] References Cited
UNITED STATES PATENTS

| | | | |
|---|---|---|---|
| 2,510,605 | 6/1950 | Porter et al. | 260/294.9 |
| 2,839,535 | 6/1958 | Hadley et al. | 260/294.9 |
| 3,804,156 | 4/1974 | Yokohama et al. | 260/295.5 R |
| 3,812,171 | 5/1974 | Neikam et al. | 260/294.9 |

FOREIGN PATENTS OR APPLICATIONS

| | | | |
|---|---|---|---|
| 2,008,648 | 9/1970 | Germany | 260/465 H |
| 671,763 | 5/1972 | United Kingdom | 260/294.9 |
| 777,746 | 6/1957 | United Kingdom | 260/294.9 |
| 790,937 | 2/1958 | United Kingdom | 260/294.9 |
| 1,283,240 | 11/1968 | Germany | 260/294.9 |

OTHER PUBLICATIONS

Arikhipova et al., Zhurnal Prikladnoi Khimii, vol. 35, pp. 389–393 (1962).
Arikhipova et al., Zhurnal Prikladnoi Khimii, vol. 37, pp. 2468–2473 (1964).
Lebedeva et al., Chemical Abstracts, vol. 72, Abst. no. 59870y (1970) (Abst. of Lebedeva et al., Izv. Akad, Nauk SSR, Ser. Khim, vol. 19 pp. 81–83 (1969).

*Primary Examiner*—John D. Randolph
*Attorney, Agent, or Firm*—Elliot M. Olstein; Michael Klotz; J. G. Ackerman

[57] ABSTRACT

Mono-and di-lower alkyl substituted pyridines can be converted to pyridine nitriles by reaction with ammonia, in the substantial absence of free oxygen, and in the presence of a transition metal oxide catalyst. Intermediate products can be recycled to the nitrile production step. The nitrile can be converted to the carboxylic acid by; aqueous hydrolysis, in the presence of ammonia or ammonium salts, at temperatures between about 200°F and 450°F. Ammonia is stripped from the hydrolysis mixture by passing a stripping gas through the mixture. In a preferred embodiment, the hydrolysis and stripping are performed simultaneously and continuously, with the hydrolysis mixture and stripping gas moving countercurrently to each other.

23 Claims, 1 Drawing Figure

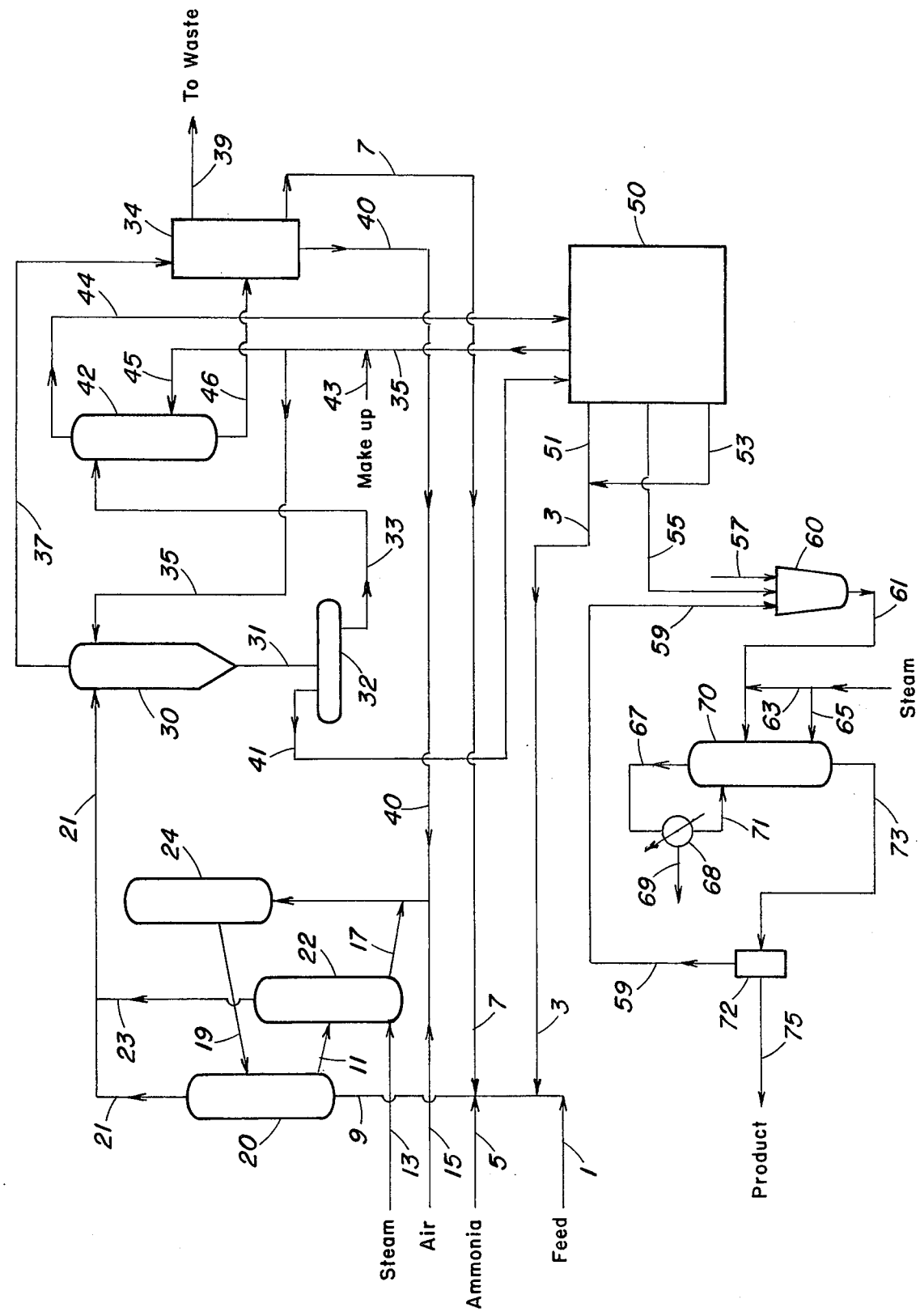

3,929,811

PRODUCTION OF PYRIDINE NITRILES AND CARBOXYLIC ACIDS

RELATED APPLICATIONS

This application is a continuation-in-part of our U.S. application 415,991, filed Nov. 15, 1973, bearing the same title, now abandoned.

BACKGROUND OF PRIOR ART

This invention relates to the production of pyridine derivatives, more particularly to the production of pyridine nitriles and carboxylic acids, especially mononitriles and mono-carboxylic acids, utilizing mono-and/or di-lower alkyl pyridines as the starting material. In a particularly preferred form, this invention relates to the production of nicotinonitrile and/or nicotinic acid from a mono-or di-lower alkyl pyridine, such as beta-picoline, 2,3-dimethylpyridine, or 2-methyl, 5-ethylpyridine.

Nicotinic acid is one of the constituents of the vitamin B complex, and is generally manufactured by oxidation of a corresponding mono-or di-lower alkyl pyridine, for example beta-picoline or 2,5-dimethylpyridine, with nitric acid, sulfuric acid, dichromate, or by catalytic air oxidation. In other processes the amide rather than the acid is produced, the amide then being used as a starting material for vitamin B-related derivatives, and numerous other compounds said to be useful as pharmaceuticals. Other references disclose the production of nicotinonitrile by ammoxidation of a corresponding mono-or di-lower alkyl pyridine, such as beta-picoline and 2-methyl, 5-ethylpyridine, with oxygen, in the presence of various catalysts.

Nicotinamide is generally prepared either by dehydration of nicotinic acid in the presence of ammonia or by partial hydrolysis of nicotinonitrile in slightly alkaline or aqueous solutions. U.S. Pat. No. 2,904,552, for instance, discloses the use of mildly alkaline catalysts, especially magnesium oxide and alkaline earth metal carbonates, to catalyze this partial hydrolysis. It is mentioned that large amounts of alkali will "react with their equivalent of nicotinamide giving a salt of nicotinic acid together with ammonia", and that the alkali substances also catalyze further hydrolysis of the amide to the ammonium salt of the carboxylic acid. This is stated to be undesirable, as it results in a further loss of amide product.

Since the nicotinic acid is to be utilized as a part of a vitamin B complex, it is required that it be of quite high purity. Production of nicotinic acid by direct oxidation of alkyl pyridines results in the product containing oxidation by-products, or nitrogenous compounds (when the oxidation is performed using nitric acid), all of which must be separated from the acid prior to its being utilized as a food supplement. In commercial plants producing nicotinic acid and/or its derivatives, the purification section is large and contributes a great portion of the production cost.

It is an object of the present invention to provide an improved process for production of pyridine nitriles and/or pyridine carboxylic acids. It is a further object of this invention to provide a process for production of pyridine nitriles and/or pyridine carboxylic acids from mono-or dialkyl pyridines.

A further object of this invention is to provide a process for production of pyridine mononitriles and/or mono-carboxylic acids from mono-and/or di-lower alkyl pyridines.

Yet another object of the present invention is to provide a process for production of nicotinonitrile and/or nicotinic acid in comparatively pure form, the latter suitable for use as a food supplement.

Another object of this invention is to provide an integrated and continuous process for the preparation of nicotinic acid from mono-and/or di-lower alkyl pyridines. Still another object of the present invention is to provide a process for the production of nicotinonitrile and/or nicotinic acid from a mixture of mono-and di-lower alkyl pyridines.

It is also an object of this present invention to provide a process for conversion of either 2,3 dimethylpyridine or 2-methyl, 5-ethylpyridine to nicotinonitrile and/or nicotinic acid.

SUMMARY OF THE INVENTION

In one aspect, the invention comprises a process for producing a pyridine mononitrile comprising contacting a member of the group consisting of mono-and di-lower alkyl pyridines and mixtures thereof with ammonia in the substantial absence of free oxygen and in the presence of a catalyst comprising an oxide of at least one metal selected from the group consisting of metals having atomic numbers 21 through 33, 39 through 51, 57 through 71, 72 through 83, 90 and 92, said oxide supported on a porous support, said support containing a weight ratio of metal oxide to support ranging from about 0.3:1 to about 3:1 substantially entirely within the pores of the support, said metal oxide having been placed substantially entirely within the pores of a support having a surface area greater than about 50 m²/gm and a porosity greater than about 0.4 cc/gm.

In another aspect, this invention relates to a process for producing a pyridine monocarboxylic acid comprising the steps of (a) contacting a member of the group consisting of mono-and di-lower alkyl pyridines and mixtures thereof with ammonia in the substantial absence of free oxygen and in the presence of a catalyst comprising an oxide of at least one metal selected from the group consisting of metals having atomic numbers 21 through 33, 39 through 51, 57 through 71, 72 through 83, 90 and 92, said oxide supported on a porous support, said support containing a weight ratio of metal oxide to support ranging from about 0.3:1 to about 3:1 substantially entirely within the pores of the support, said metal oxide having been placed substantially entirely within the pores of a support having a surface area greater than about 50 m²/gm and a porosity greater than about 0.4 cc/gm, to produce a corresponding pyridine mononitrile; (b) contacting the product of step (a) with water and a catalyst selected from the group consisting of ammonia and ammonium salts at a temperature of between about 250°F and about 450°F and autogenous pressure; and (c) stripping ammonia from the composition of (b) with an inert gas.

DESCRIPTION OF DRAWING

The figure shows a general flow sheet for the conduct of an integrated process according to one embodiment of the invention.

DETAILED DESCRIPTION AND PREFERRED EMBODIMENTS

In the following description, the invention will be referred to in terms of a process for producing nicotinonitrile and/or nicotinic acid from 2,3-dimethylpyridine. However, as mentioned previously, and as will be shown inter alia in the examples which follow, the invention is also applicable to the production of nicotinonitrile and/or nicotinic acid from feeds including beta-picoline, 2-methyl, 5-ethylpyridine, and mixtures of any two or more of these compounds, as well as from feeds containing 2-methyl, 3-cyano-or 2-cyano, 3-methyl-pyridine and mixtures thereof. Additionally, the invention is also applicable to the production of cyanopyridines and pyridine carboxylic acids other than nicotinonitrile and nicotinic acid, such as isonicotinonitrile and its corresponding acid, and picolinonitrile and picolinic acid (2-pyridinecarboxylic acid).

Suitable feeds, in general, include pyridines having lower alkyl, i.e. methyl and/or ethyl substituents, such as 2-, 3-and 4-picolines, 2,3-, 2,4-and 2,5-dimethylpyridines, 2-, 3-and 4-ethylpyridines, 2-methyl, 5-ethylpyridine and methylcyanopyridines.

In the first step, the feed (e.g. 2,3-dimethylpyridine) is contacted with ammonia in the vapor phase in the presence of a supported metal oxide, and in the substantial absence of free oxygen, at temperatures between about 575°F and about 930°F (about 300°C and about 500°C), preferably between about 700°F and about 850°F. The supported metal oxide catalyst also functions to supply oxygen to the reaction and is itself reduced during the process, is prepared in accordance with the procedure described in U.S. application Ser No. 147,159, filed May 26, 1971 (which is a continuation-in-part of U.S. application Ser. No. 803,874, filed Feb. 27, 1969), of Abraham P. Gelbein, entitled "Supported Metal Oxides and Uses Therefor", and assigned to The Lummus Company, and which is hereby incorporated by reference into this application. Briefly, the process involves fusing a metal oxide of at least one metal selected from the group consisting of metals having atomic numbers 21 through 33, 39 through 51, 57 through 71, 72 through 83, 90 and 92, on a porous support having a surface area greater than about 50 m²/gm, and a porosity greater than about 0.4 cc/gm, so that the metal oxide is substantially entirely within the pores of the support and the catalyst contains a weight ratio of metal oxide to support of from about 0.3:1 to about 3:1. The preferred metal oxide is vanadium pentoxide. Preferred supports are gamma-alumina and silica-alumina.

The reaction is preferably carried out in a fluidized bed of the catalyst. The catalyst is removed from the reactor, stripped of foreign materials, contacted with a gas containing free oxygen, such as air, in a separate vessel, and then recycled to the nitrile production zone.

The desired nitrile can be recovered from the gaseous reaction products by quenching and subsequent recovery steps such as distillation. The nitrile product can be utilized as such, or may be passed to a subsequent step for further treatment such as conversion to the corresponding pyridinecarboxylic acid or amide.

The nitrile production step may also result in the formation of intermediate products of the reaction, for example, methylcyanopyridines or beta-picoline (resulting from demethylation of 2,3-dimethylpyridine). Products such as these can be recovered and recycled to the nitrile production reactor to be converted to nicotinonitrile.

To produce nicotinic acid, the nicotinonitrile, after separation from other reaction products, is introduced into a hydrolysis reactor and hydrolyzed in the presence of a catalyst selected from the group consisting of ammonia and ammonium salts, to the ammonium salt of nicotinic acid. The hydrolysis is conducted at temperatures of between about 200°F and about 450°F, and under the autogenous pressure of the system. The ammonium nicotinate is then converted to nicotinic acid by stripping of the ammonia with an inert gas, such as steam. Suitable apparatus is disclosed, for example, in the copending U.S. application Ser. No. 458,199, filed Apr. 5, 1974, now U.S. Pat. No. 3,922,147 of Morgan C. Sze and Benjamin J. Luberoff, entitled "Hydrolysis Reactor" and also assigned to The Lummus Company, and which is incorporated herein by reference.

In a preferred embodiment, the hydrolysis and stripping are carried out in a continuous manner, with the nitrile and ammonia (or ammonium salt) continuously introduced into an upper portion of a hydrolysis reactor, steam or other inert stripping gas coninuously introduced into a lower portion of the hydrolysis reactor, ammonia (together with stripping gas) being continuously removed as overhead of the reactor, and product stream containing nicotinic acid (or other carboxylic acid product) being continuously removed from a lower portion of the reactor. In this embodiment the reactor generally disposed vertically.

In another embodiment, the conversion is carried out as a two-step process, with the nicotinonitrile being hydrolyzed to ammonium nicotinate, and the ammonium nicotinate product then being converted to the free acid by a thermal decomposition step, with continuous removal of ammonia by a stripping gas, e.g. steam. The thermal decomposition is carried out at temperatures of about 200°F to about 400°F in any suitable manner, e.g. dry in an inert liquid, by spray drying, etc.

The hydrolysis is carried out at temperatures of between 200°F and about 450°F, preferably between 250°F and about 400°F, at a residence time of 1 to 10 hours, preferably 2 to 8 hours, most preferably 2 to 6 hours. The autogenous pressure of the system will vary according to the steam pressure and temperature and concentration of materials in the feed, but is usually between about 100 and 300 psia. In a preferred embodiment, ammonia is introduced into the hydrolysis reactor, either by injection into the hydrolysis feed or by separate introduction into the reactor. The hydrolysis reaction can also be enhanced by recycle of ammonium nicotinate, or by introduction of other ammonium salts into the reactor, or both. The effect of ammonia can be enhanced by maintaining a high ammonia concentration in the upper portion of the reactor, for example, by injecting additional ammonia into the reactor or by bleeding off some of the stripping gas before it reaches the top of the column (when the stripping and hydrolysis occur simultaneously). Addition of ammonia in an amount of about 2 to 10 mol% based on the water present in the total mixture results in a substantial increase in the rate of hydrolysis reaction.

The preferred stripping gas is steam; however, any gas which is inert with respect to the reactants and materials in the hydrolyzer and does not condense under the operating temperatures and pressures may be used. Suitable gases include nitrogen, hydrocarbons such as methane and propane, and fluorocarbons such as the Freon series.

The nicotinic acid product is recovered from the preferred embodiment of the process by cooling the hydrolysis products so that the free acid precipitates out. The acid is then purified by filtration, washing, centrifuging, and/or similar techniques. Recovered mother liquors, containing ammonium nicotinate and intermediate hydrolysis products, such as nicotinamide, can be recycled to the hydrolysis step.

The figure shows a general flow sheet depicting the conduct of the invention as embodied in an integrated process for producing nicotinic acid from a lower alkyl pyridine feed (e.g. 2,3-dimethylpyridine). It is to be understood that this is not intended to be regarded as limiting the scope of the invention since the invention may consist in preparation of the nitrile only, and may also consist in the preparation of nicotinic acid from other feeds, including nicotinonitrile produced by methods other than those herein described as well as preparation of other pyridine carboxylic acids.

As shown in the drawing, an alkyl pyridine, such as 2,3-dimethylpyridine, is introduced into the system in line 1. To the feed in line 1 is added a recycle stream in line 3, derived from sources as explained hereinafter. Ammonia is added in lines 5 and 7, and the total stream introduced through line 9 into ammonolysis reactor 20, which contains a vanadium oxide fused catalyst, prepared as disclosed in U.S. application Ser No. 147,159, referred to hereinabove. Spent catalyst is removed from the reactor in line 11, and is stripped of volatile matter in catalyst stripper 22 by steam introduced through line 13. The stripped catalyst is then removed from catalyst stripper 22 by line 17 where it is conveyed by a stream of heated air in line 15 into regeneration vessel 24, in which the catalyst is re-oxidized. The catalyst is then returned to reactor 20 in line 19.

Gaseous reaction products are removed in line 21, and together with volatile matter from stripper 22 (removed through line 23) are introduced into quench tower 30 in which they are quenched by a stream of quench fluid hereinafter defined, introduced through line 35. The quenched products are removed from the bottom of quench tower 30 in line 31, and conveyed to separator 32, in which an organic layer and an aqueous layer are separated. The aqueous layer, containing dissolved ammonia, carbon dioxide and other reaction products, is passed in line 33 to extractor 42 in which residual amounts of reaction products are removed by countercurrent extraction with a stream of composition substantially the same as the quench liquid. An aqueous stream consisting primarily of stripping steam used in vessel 22 and water formed during this ammonolysis reaction, along with the quench tower overhead in line 37, is introduced into a purification section, generally indicated as 34. From the purification section there result inter alia, a waste or purge stream 39 and a stream containing largely ammonia, which can be recycled to the feed via line 7. A gaseous overhead 40 will also be produced. This stream if found to contain no pollutants, may be safely vented to the atmosphere. However, if found to contain hydrogen cyanide, venting cannot be performed—overhead 40 is most advantageously conbined with air in line 15 so that the hydrogen cyanide is destroyed by combustion in regeneration 24.

The organic layer from separator 32 is removed in line 41 and, together with the extract in line 44, is introduced into a distillation section generally indicated as 50, which may consist of one or more distillation columns and associated apparatus. Three distillation products are recovered. A light fraction, containing, mainly beta-picoline and uncoverted 2,3-dimethylpyridine, can be recycled to the ammonolysis reactor 20 via lines 51 and 3. The residual fraction, which contains mainly methylcyanopyridines, can also be recycled to the ammonolysis reactor, via lines 53 and 3. The distillation can be conducted so that the middle cut contains practically pure nicotinonitrile. In a preferred embodiment, distillation section 50 comprises two units, a light organic distillation unit, and a nicotinonitrile still. The light organics unit serves to separate beta-picoline, 2,3-dimethylpyridine and small amounts of pyridine from nicotinonitrile and methylcyanopyridines. A second unit, preferably operated under vacuum, serves to separate essentially pure nicotinonitrile from methylcyanopyridines, which can be recycled to reactor 20.

Quench fluid is also recovered from this distillation section and recycled by line 35 to the quench tower 30. Makeup quench fluid may be introduced through line 43. A portion of the fluid in line 35 is withdrawn in line 45 for use in extractor 42.

The nicotinonitrile is removed from the distillation section through line 55, and introduced into mixing tank 60, in which it is mixed with ammonia (introduced through line 57) and a recycled aqueous solution of ammonium nicotinate and other intermediate hydrolysis products, introduced in line 59. The combined feed passes through line 61 into the upper portion of a hydrolysis reactor 70. Steam is injected into the feed line in line 63, and steam is also introduced through line 65, into a lower portion of reactor 70, to serve as stripping gas. In the reactor the feed in line 61 is subjected to simultaneous hydrolysis and steam stripping. The overhead, containing primarily ammonia and stripping gas, is removed through lines 67 and 69. The ammonia may be passed to an ammonia still, purified, and a portion recycled to line 57. The remainder is recycled to reactor 20 in line 7. Nicotinic acid is volatile and some may be carried out in the overhead; it may be recovered in reflux condenser 68 and returned to the reactor in line 71. A product stream is removed from the lower portion of the reactor in line 73. The product stream is introduced into purification section 72, in which nicotinic acid is recovered by conventional steps such as cooling the product to precipitate the acid, followed by centrifuging, filtering, drying, etc. Nicotinic acid product is removed from the purification section in line 75. A filtrate or mother liquor can be removed in line 59 and recycled to mixing tank 60. The filtrate or mother liquor can be useful for hydrolysis as it contains intermediate hydrolysis products such as nicotinamide and ammonium nicotinate, which can be either hydrolyzed to additional nicotinic acid, or in the case of ammonium nicotinate, can also assist in catalyzing the hydrolysis reaction.

As described above, the hydrolysis is carried out in a vertically disposed reactor with simultaneous hydrolysis and steam stripping. However, as mentioned previously, the hydrolysis may also be carried out in the apparatus described in application Ser. No. 458,199 filed Apr. 5, 1974, of Morgan C. Sze and Benjamin J. Luberoff entitled "Hydrolysis Reactor" (Lummus Case 2632). In such case the hydrolysis and steam stripping will be performed in separate sections of the reactor. The overall process, however, is not changed.

The quench fluid utilized in quench tower 30 and extractor 42 is a suitable organic solvent having a boiling point below that of pyridine and inert with respect to the reactants and products. Particularly suitable are toluene and benzene. Alternatively, a portion of the aqueous layer from separator 32, passing through line 33, can be diverted and recycled for use as the quench liquid. Practically speaking, this stream comprises a dilute aqueous solution of ammonium carbonate, plus a small amount of dissolved organics. In such a case, extractor 42 would not be necessary, as this remaining portion of the aqueous layer would be most suitably treated in purification section 34, and a recycle stream of organic, comprising unreacted feed plus by-products, would be recovered and recycled to the reactor in line 3.

To further illustrate the invention, the following examples are provided.

EXAMPLES 1–3

A gaseous mixture as shown in the following Table 1 was passed through a fluid bed reactor containing 300g of a fused catalyst containing 40 weight % vanadium pentoxide supported on silica alumina. The catalyst was continuously circulated between the reactor, stripper and regenerator at a catalyst circulation rate of about 100g/min. The catalyst was prepared by mechanically blending vanadium pentoxide with a commercially available silica-alumina (a fluid cracking catalyst, 87% $SiO_2$, 13% $Al_2O_3$, with a pore volume of 0.75 cc/g, a surface area of 200 m²/g and average particle size of 60 microns, sold under the trade name AEROCAT). The mixture was treated for five hours at 700°C, during which time the vanadium pentoxide fused and was drawn into the pores of the support. Reaction pressure was maintained at 1 atm, temperature and other conditions as shown in Table 1. The reaction products were quenched in two stages with toluene, at about 25°C., and the ammonia subsequently collected in an acid trap. Intermediate products and unreacted feed were recycled to the reactor, as shown.

TABLE 1

Catalyst
Aerocat (American Cyanamid) as support
Wt% $V_2O_5$ 40
Circulation rate, g/min. 100 (approx.)

| Example Number | 1 | | | 2 | | 3 | |
|---|---|---|---|---|---|---|---|
| Operating Conditions | | | | | | | |
| Temperature, °F | | | | | | | |
| Reactor | 825 | | | 775 | | 800 | |
| Catalyst Stripper | 850 | | | 775 | | 800 | |
| Catalyst Regenerator | 880 | | | 910 | | 910 | |
| Reactor feed composition, mole%[a] | | | | | | | |
| 2,3 Lutidine | 4.54 | | | 7.5 | | 6.3 | |
| B-Picoline | 0.527 | | | — | | — | |
| Methyl cyanopyridine | 0.404 | | | — | | — | |
| Pyridine | 0.012 | | | — | | — | |
| Nicotinonitrile | 0.020 | | | — | | — | |
| Ammonia | 51.5 | | | 20.5 | | 21.9 | |
| Nitrogen | 43.0 | | | 72.0 | | — | |
| Argon | — | | | — | | 71.8 | |
| Organic feed (total) g-moles | 9.92 | | | 1.94 | | 3.08 | |
| Run duration, hrs. | 14.5 | | | 2.0 | | 4.0 | |
| Space velocity, hr⁻¹[b] | | | | | | | |
| LHSV | 0.19 | | | 0.22 | | 0.18 | |
| GHSV | 559 | | | 580 | | 548 | |
| Material Balance for Organics | In | Out | Measured Change | In | Out | In | Out |
| 2,3 Lutidine, g. moles | 8.18 | 0.179 | (8.00) | 1.94 | 0.266 | 3.08 | 0.178 |
| Nicotinonitrile | 0.037 | 3.24 | 3.20 | | 0.426 | | 1.18 |
| Pyridine | 0.021 | 0.058 | 0.037 | | 0.059 | | 0.078 |
| B-Picoline | 0.950 | 2.25 | 1.30 | | 0.560 | | 0.651 |
| Methyl cyanopyridine | 0.729 | 1.58 | 0.85 | | 0.232 | | 0.315 |
| Carbon oxides (lutidine equiv.) | — | 0.994 | | | 0.227 | | 0.370 |
| Hydrogen cyanide | — | trace | | | trace | | trace |
| | 9.92 | 8.30 | | 1.94 | 1.77 | 3.08 | 2.78 |
| Material balance closure, mole% | | 83.7 | | | 91.2 | | 90.3 |
| Lutidine conversion[c] | | 97.8 | | | 85.0 | | 93.6 |
| Selectivity[c] | | | | | | | |
| Nicotinonitrile + recycle | | 83.9 | | | 81.0 | | 82.8 |
| Pyridine | | 0.6 | | | 3.9 | | 3.0 |
| Carbon oxides | | 15.5 | | | 15.1 | | 14.2 |
| Ammonia combustion[d] | | — | | | — | | less than 0.5 |
| Space-time yield, lb. nico/lb. cat-hr[e] | | 0.10[f] | | | 0.085 | | 0.087 |

[a]Stripper feed is either nitrogen or argon. Regenerator feed is air.
[b]Based on reactor catalyst volume of 500 cc.
[c]Normalized values.
[d]Percent of feed ammonia.
[e](moles nico + moles recycle/2)104/(500)( run duration)
[f]Based on 300 g. catalyst.

EXAMPLE 4

A feed comprising 2-methyl, 5-ethylpyridine was contacted in a similar apparatus and with the same catalyst (300) as in Example 1–3. Reactor and catalyst stripper temperatues were 810°F; the catalyst regenerator was operated at 910°F. The gas circulation rate was about 100 g/min. The results and operating conditions are shown in Table II.

TABLE II

| Reactor feed composition, mole% | | | |
|---|---|---|---|
| Methyl ethyl pyridine | 4.0 | | |
| Light ends | 0.24 | | |
| Heavy ends | 0.06 | | |
| $NH_3$ | 27.3 | | |
| $N_2$ | 68.4 | | |
| Organic feed (total) 3.73 g-moles | | | |
| Run duration, hrs. | 8.8 | | |
| Space velocity,[a] | $hr^{-1}$ | | |
| LHSV | 0.12 | | |
| GHSV | 439 | | |

| Material Balance for Organics | In | Out | Measured Change |
|---|---|---|---|
| Methyl ethyl pyridine, g. moles | 3.47 | 0.198 | (3.27) |
| Nicotinonitrile | — | 2.10 | 2.10 |
| Pyridine | — | 0.103 | 0.103 |
| Light ends | 0.208 | 0.289 | 0.081 |
| Heavy ends | 0.049 | 0.148 | 0.099 |
| Carbon oxides | — | 0.590 | |
| | 3.73 | 3.43 | |
| Material balance closure, mole% | 91.9 | | |
| Methyl ethyl pyridine conversion [b] | 94.2 | | |
| Selectivity[b] | | | |
| Nicotinonitrile + recycle | 76.6 | | |
| Pyridine | 3.5 | | |
| Carbon oxides | 19.9 | | |
| Space yield, lbs. nico/lb. cat-hr[c] | 0.052 | | |

[a]Based on reactor catalyst volume of 500 cc.
[b]Normalized values.
[c](moles nico + moles recycle/2)104/(500)(run duration)

EXAMPLE 5

To demonstrate that the alkyl-substituted pyridine nitriles (including methylcyanopyridine) produced as by-products in Examples 1 – 4 can also be converted to nicotinonitrile by the process of the present invention, a gaseous mixture of ammonia and methylcyanopyridine was reacted over the same catalyst and equipment as in Examples 1–4. The reaction temperature was 800°F. Conversion of the feed was approximately 50 mol % to nicotinonitrile and beta-picoline, with nicotinonitrile predominating. A small amount of pyridine was also obtained.

EXAMPLE 6

A feed as specified in Table 1 was introduced into a reactor system having a circulating catalyst as in Example 1–4. Temperature was maintained at about 825°F.

Table 1

| Feed Composition | |
|---|---|
| Pyridine | 0.6 mol % |
| Beta-Picoline | 19.3 mol % |
| 2,3-Dimethylpyridine | 78.6 mol % |
| Nicotinonitrile | 0.3 mol % |
| Methylcyanopyridine | 1.1 mol % |
| Ammonia | 2.4 1/min. (STP) |

The reaction products were quenched in a water quench system, and the organic product mixture separated by conventional distillation into a light cut containing pyridine, beta-picoline, and 2,3-dimethylpyridine, a middle cut containing pure nicotinonitrile, and a residual fraction containing primarily methylcyanopyridine. The lighter cut and residual fractions are recycled to the reactor. The products of the reaction were as follows:

| Compound | Product Composition Mol% | Net Yield Mol% (Based on 2,3-Dimethylpyridine) |
|---|---|---|
| Pyridine | 1.1 | 0.4 |
| Beta-Picoline | 28.6 | 4.5 |
| 2,3-Dimethylpyridine | 6.9 | — |
| Nicotinonitrile | 46.1 | 52.0 |
| Methylcyanopyridine | 17.4 | 18.1 |
| Carbon Dioxide | — | 25.0 |

EXAMPLE 7

A mixture of 30 weight % nicotinonitrile, prepared as in Examples 1–3, was hydrolyzed in 4 M aqueous ammonia at 340°F and 175 psig for 4 hours. The reaction product, an aqueous solution of ammonium nicotinate (corresponding to about 100% of the nicotinonitrile charged) was stripped with steam at 340°F. Nicotinic acid was recovered by cooling the stripped solution, filtering and recrystallization from water, and assayed (dry) as 100% nicotinic acid.

EXAMPLE 8

A mixture of 17 weight % nicotinonitrile, prepared as in Example 4, in 4 M aqueous ammonia was hydrolyzed at 340°F for 4 hours. The reaction product, an aqueous solution of ammonium nicotinate (corresponding to about 90 mol % of the nicotinonitrile charged) and nicotinamide was stripped with a steam/nitrogen mixture at 1 atm and 100°C. On cooling this stripped solution, a pure white nicotinic acid product separated out.

The above constitutes a description of the invention however, additional embodiments and alternatives may be readily apparent to those skilled in the art. Consequently, the invention is not construed to be limited except as defined in the following claims.

We claim:

1. A process for producing nicotinic acid, comprising:
   a. contacting in a nitrile production zone a member selected from the group consisting of 2,3-picoline, 2,3- and 2,5-dimethylpyridine, 2-methyl, 5-ehtyl-pyridine, 2,3-ethylpyridine and mixtures thereof with ammonina and vanadium pentoxide supported on a porous support selected from the group consisting of silica-alumina and gamma-alumina, said vanadium pentoxide being present in an amount to provide a vanadium pentoxide to support weight ratio ranging from about 0.3:1 to about 3:1 substantially entirely eithin the pores of the support, said vanadium pentoxide having been placed in molten form substantially within the pores of a support having a surface area greater than about 50 $m^2/gm$ and a porosity greater than about 0.4 cc/gm, said contacting being effected in the absence of molecular oxygen;
   b. withdrawing a gaseous effluent from the nitrile production zone;
   c. separating organic components from the gaseous effluent, said organic components including nicotinonitrile, unreacted feed and organic intermediates;
   d. introducing the separated organic components into a separation zone to separate nicotinonitrile from unreacted feed and organic intermediates;
   e. recycling the unreacted feed and organic intermediates to the nitrile production zone;
   f. combining separated nicotinonitrile with ammonia and an aqueous recycle containing nicotinoamide and ammonium nicotinate;
   g. heating the combined streams to a temperature of from 200°F to about 450°F to effect hydrolysis of the nicotinonitrile and nicotinamide to ammonium nicotinate;
   h. heating the ammonium nicotinate to effect decomposition thereof to nicotinic acid, said decomposition being effected with continuous removal of evolved ammonia;
   i. recovering a product stream containing nicotinic acid and an aqueous solution of ammonium nicotinate and nicotinamide;
   j. separating nicotinic acid from the aqueous solution; and
   k. employing the aqueous solution of ammonium nicotinate and nicotinamide as said aqueous recycle.

2. The process of claim 1 wherein step (h) is conducted by countercurrently contacting the ammonium nicotinate with an inert gas to effect said continuous removal of evolved ammonia.

3. The process of claim 2 wherein said inert gas is steam.

4. The process of claim 1 wherein steps (g) ahd (h) are effected simultaneously.

5. The process of claim 1 wherein said feed comprises 2,3-dimethylpyridine.

6. The process of claim 1 wherein said feed comprises 3-methylpyridine.

7. The process of claim 1 wherein said feed comprises 2-methyl-5-ethylpyridine.

8. The process of claim 1 wherein step (a) is effected at a temperature from about 575°F to about 930°F.

9. The process of claim 1 wherein step (a) is effected at a temperature of from about 700°F to about 850°F.

10. The process of claim 1 wherein said support is gamma-alumina.

11. The process of claim 1 wherein said support is silica-alumina.

12. The process of claim 1 wherein in step (c) the organic components are separated from the gaseous effluent by direct contact thereof with a quench liquid to cool the gaseous effluent and condense organic components.

13. The process of claim 12 wherein the quench liquid is an organic solvent having a boiling point below that of pyridine.

14. The process of claim 13 wherein said organic solvent is toluene.

15. The process of claim 13 wherein said organic solvent is benzene.

16. The process of claim 12 wherein the quench liquid comprises water.

17. The process of claim 12 wherein the quench liquid is an aqueous solution of ammonium carbonate.

18. The process of claim 1 and further comprising withdrawing the supported vanadia from the nitrile production zone and introducing the supported vanadia into a regeneration zone wherein the vanadia is contacted with molecular oxygen to effect regeneration thereof; and recycling the regenerated supported vanadia to the nitrile production zone.

19. The process of claim 19 wherein the gaseous effluent withdrawn from the nitrile production zone includes hydrogen cyanide, said hydrogen cyanide being recovered from the gaseous effluent and introduced into said regeneration zone to effect combustion thereof.

20. A continuous process for producing nicotinic acid comprising:
   a. combining nicotinonitrile with ammonia and an aqueous recycle containing nicotinamide and ammonium nicotinate;
   b. heating the combined streams to a temperature of from 200°F to about 450°F to effect hydrolysis of the nicotinonitrile and nicotinamide to ammonium nicotinate;
   c. heating the ammonium nicotinate to effect decomposition thereof to nicotinic acid, said decomposition being effected with coninuous removal of evolved ammonia;
   d. recovering a product stream containing nicotinic acid and an aqueous solution of ammonium nicotinate and nicotinamide;
   e. separating nicotinic acid from the aqueous solution; and
   f. employing the aqueous solution of ammonium nicotinate and nicotinamide as said aqueous recycle.

21. The process of claim 20 wherein step (h) is conducted by countercurrently contacting the ammonium nicotinate with an inert gas to effect said continuous removal of evolved ammonia.

22. The process of claim 21 wherein said inert gas is steam.

23. The process of claim 20 wherein steps (b) and (c) are effected simultaneously.

* * * * *

UNITED STATES PATENT OFFICE
CERTIFICATE OF CORRECTION

Patent No. 3,929,811          Dated December 30, 1977

Inventor(s) Abraham P. Gelbein et al

It is certified that error appears in the above-identified patent and that said Letters Patent are hereby corrected as shown below:

In the Claims:

Col. 11, Line 4, cancel "2,";

Col. 11, Line 5, "ehtyl" should be --ethyl--;

Col. 11, Line 6, cancel "2,";

Col. 11, Line 7, "ammonina" should be --ammonia--;

Signed and Sealed this twenty-third Day of August 1977

[SEAL]

Attest:

RUTH C. MASON
*Attesting Officer*

C. MARSHALL DANN
*Commissioner of Patents and Trademarks*